Sept. 7, 1926.
W. B. JACKSON
1,599,397
VARIABLE SPEED TRANSMISSION
Original Filed Nov. 29, 1922   8 Sheets-Sheet 7
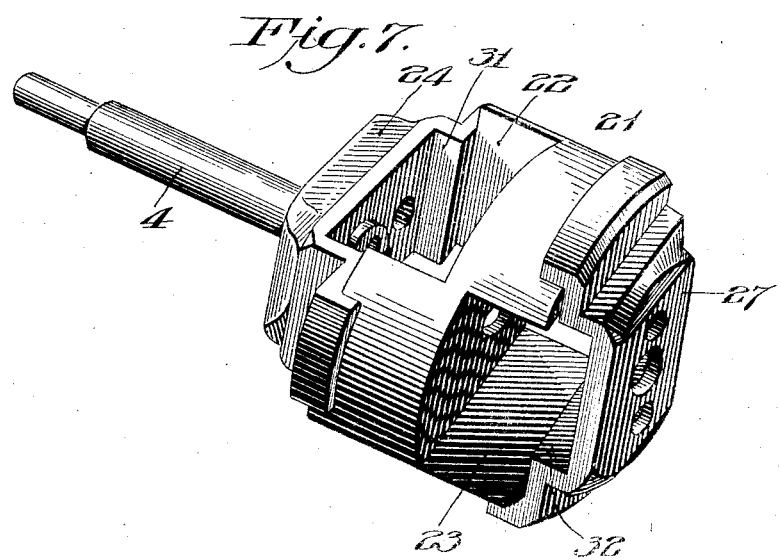
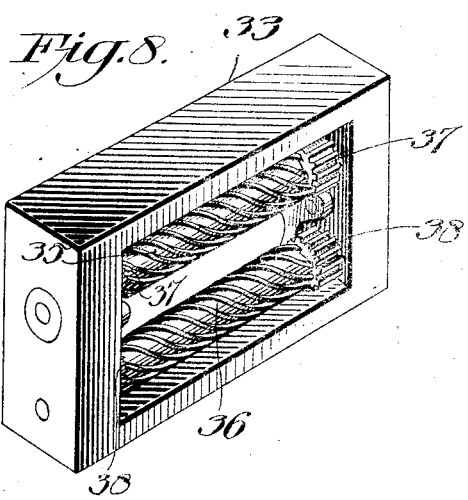
INVENTOR:
Walter B. Jackson,
BY
ATTORNEYS.

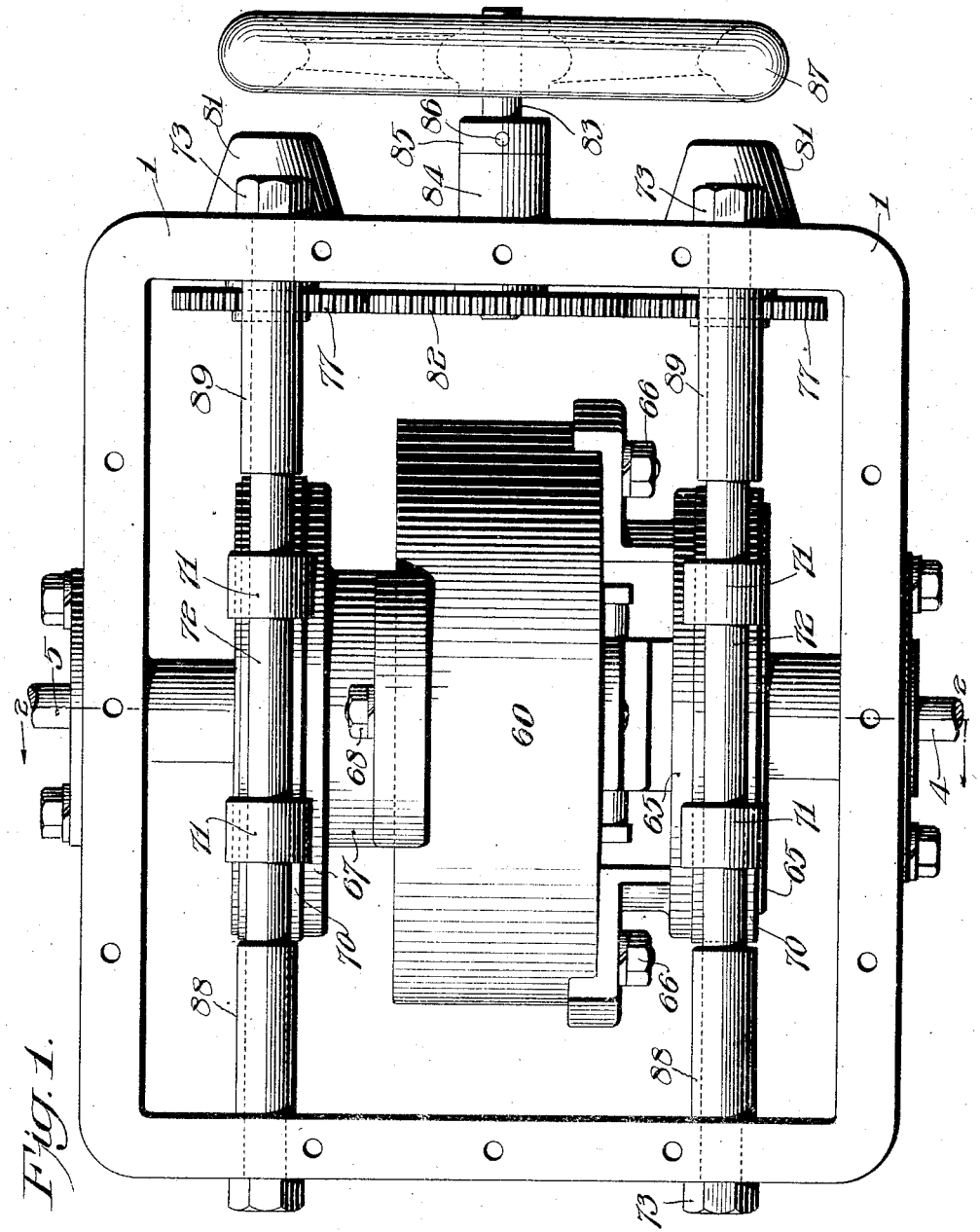

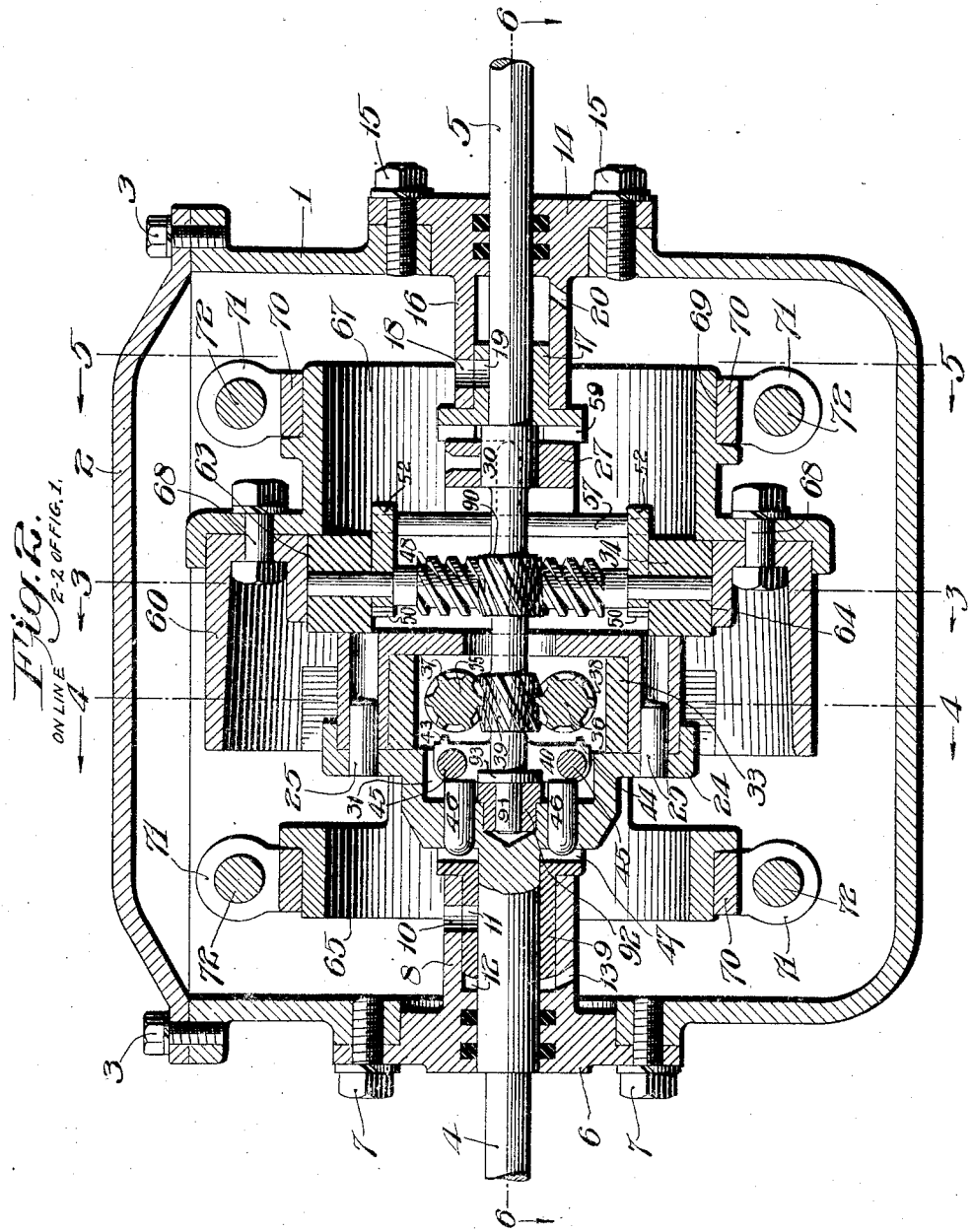

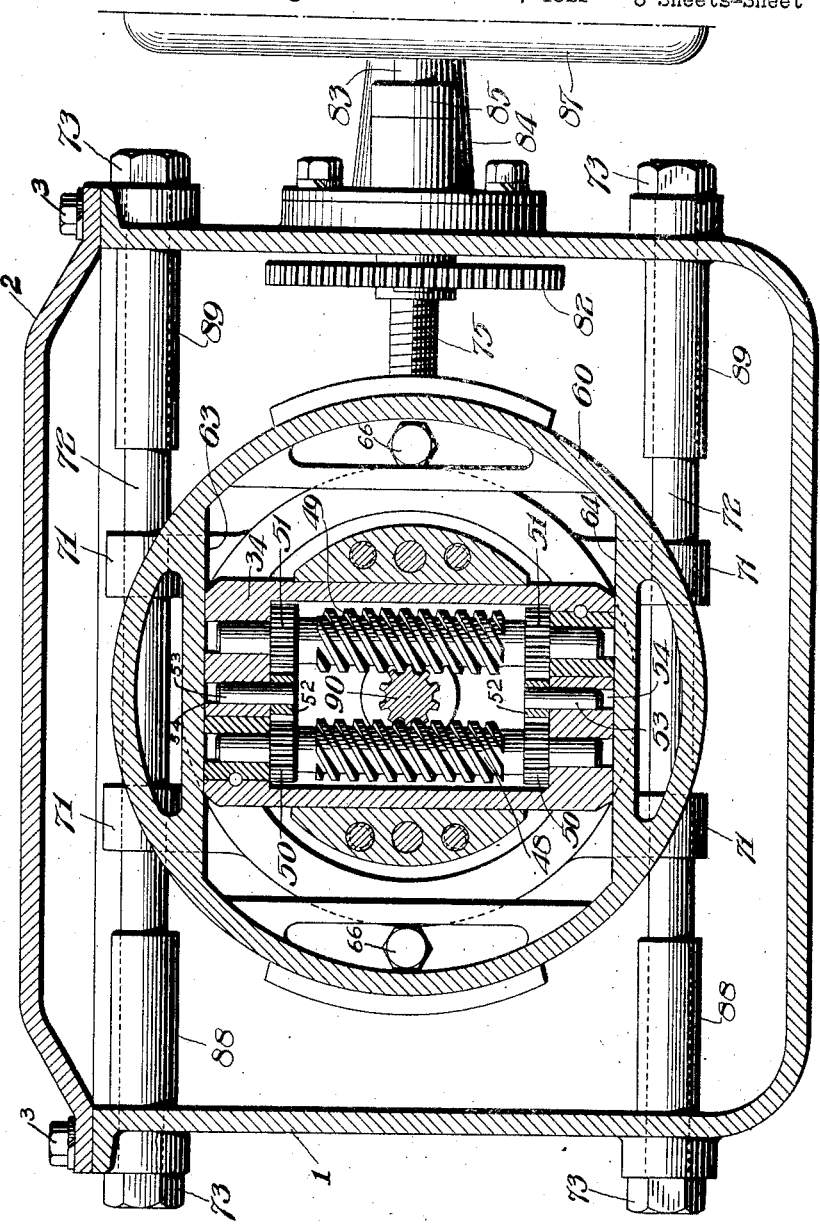

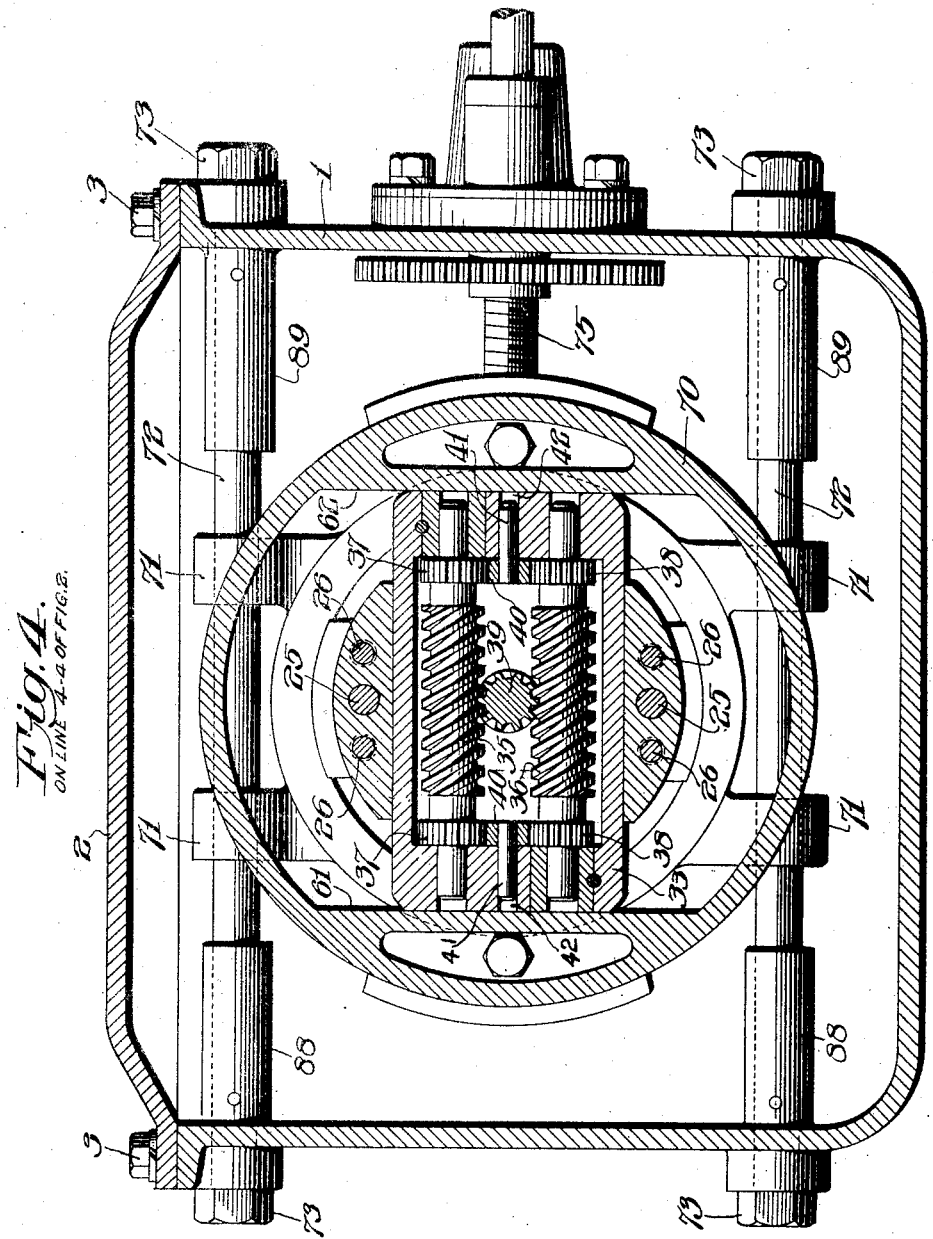

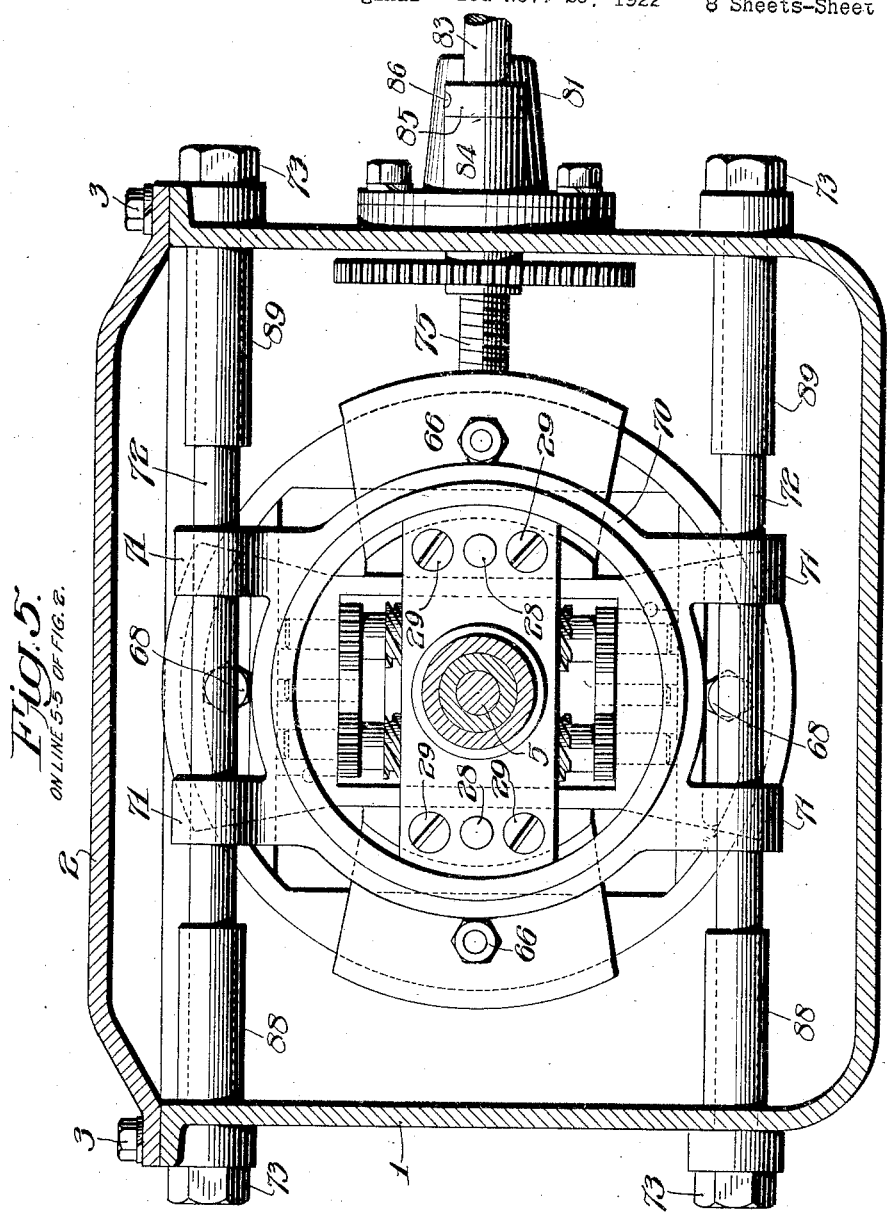

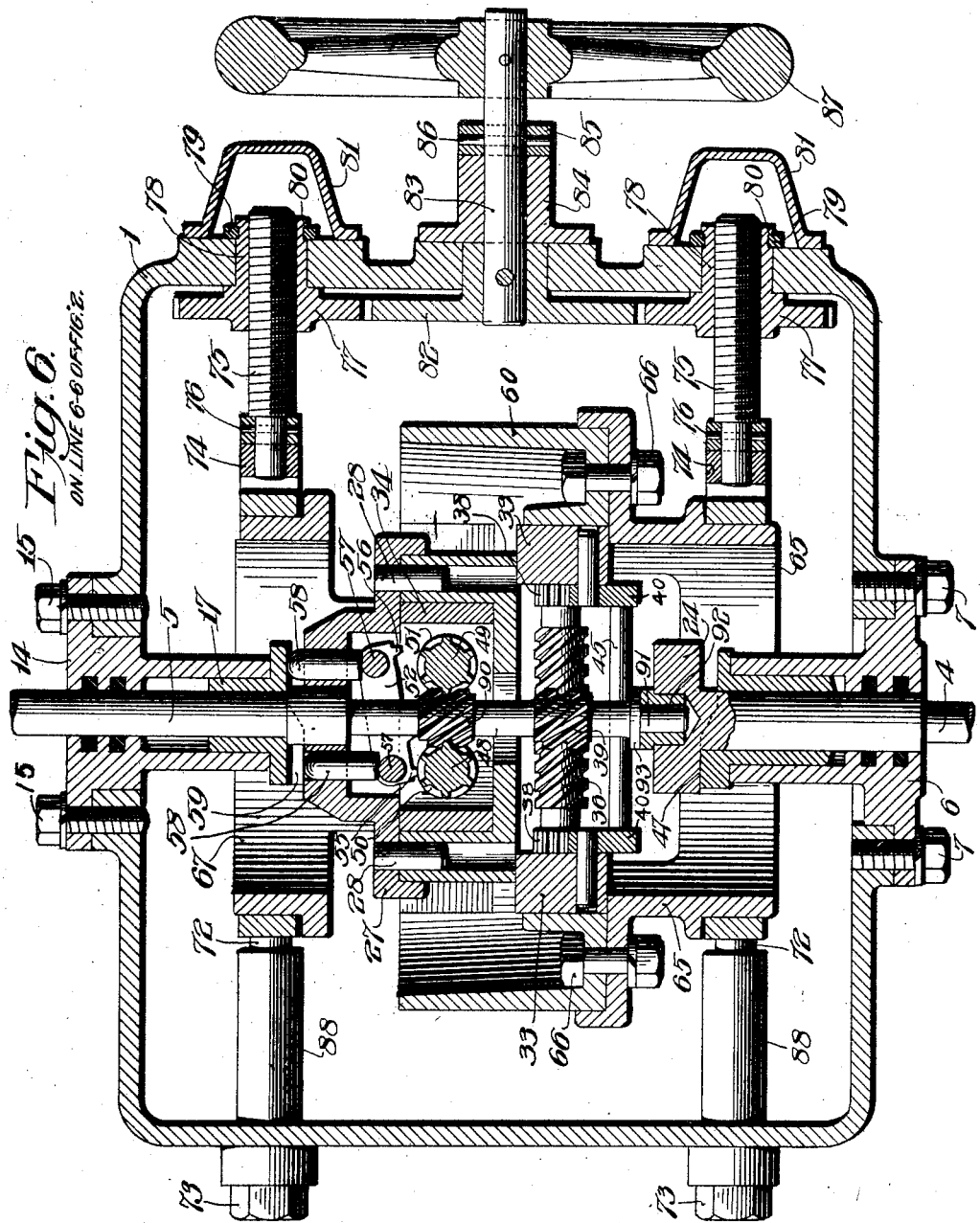

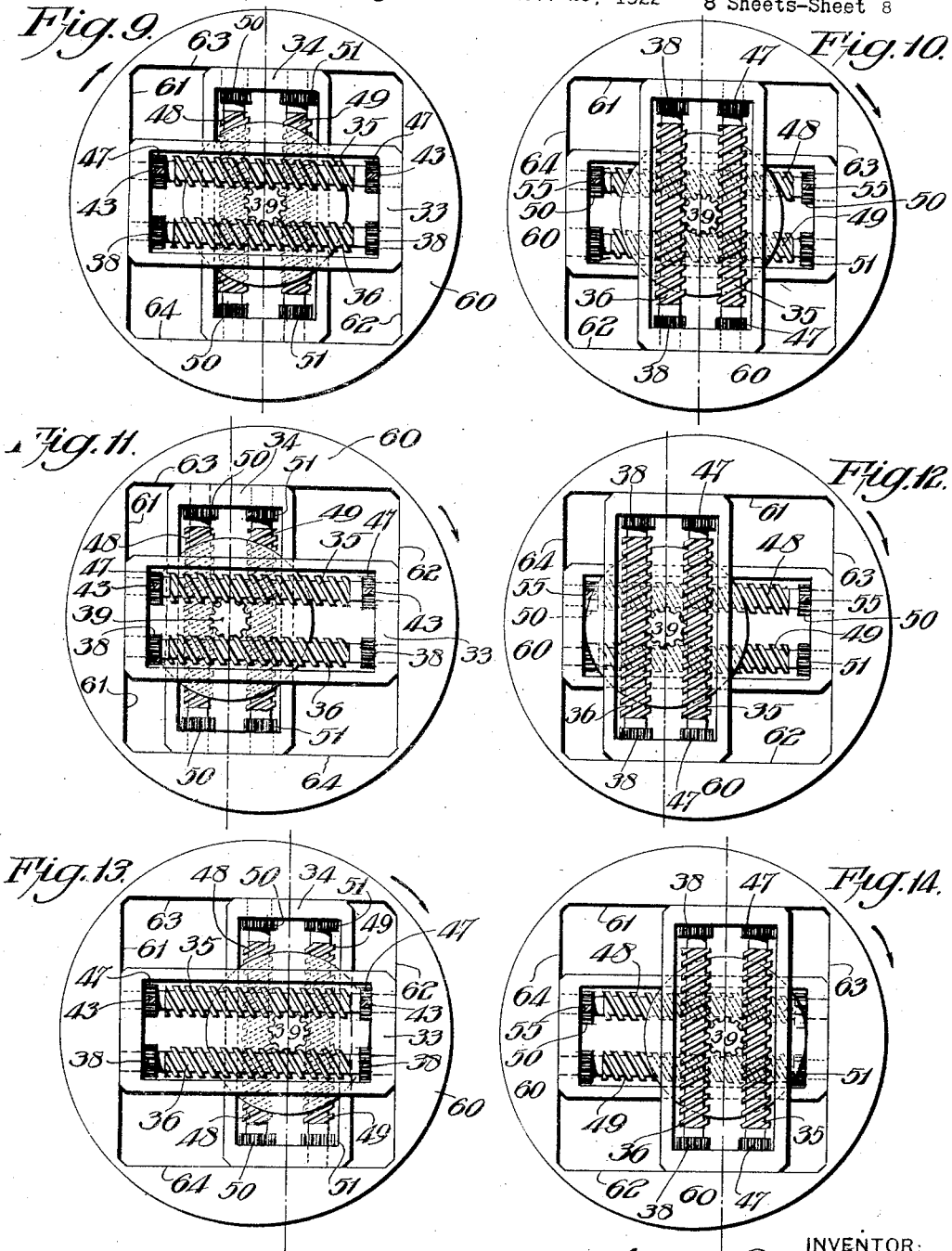
Sept. 7, 1926.
W. B. JACKSON
VARIABLE SPEED TRANSMISSION
Original Filed Nov. 29, 1922
1,599,397
8 Sheets-Sheet 8

Patented Sept. 7, 1926.

1,599,397

UNITED STATES PATENT OFFICE.

WALTER B. JACKSON, OF PHILADELPHIA, PENNSYLVANIA, ASSIGNOR TO FIDELITY DEVELOPMENT CORPORATION, OF PHILADELPHIA, PENNSYLVANIA, A CORPORATION OF DELAWARE.

VARIABLE-SPEED TRANSMISSION.

Application filed November 29, 1922, Serial No. 603,915. Renewed February 6, 1926.

My present invention comprehends a novel variable speed transmission in which the speed of the driven member can be varied at the will of the operator in any increment desired from zero to a desired maximum which may be equal to or greater than the speed of the driving member.

It further comprehends a novel variable speed transmission wherein the speed of the driven member can be varied at the will of the operator in any desired increment in a reverse direction of rotation from that of the driving member from zero to a desired maximum which may be equal to or greater than the speed of the driving member.

It further comprehends a novel construction and arrangement of mechanism contributing to form an operative connection between a driving and a driven member, and novel means to regulate said mechanism to vary the path in which it travels and thereby vary the speed relationship between the driving and the driven member.

It further comprehends a novel construction of a driving member having a fixed center of rotation and a novel construction of driven mechanism, the center of rotation of which may be adjusted.

Other novel features of construction and advantage will hereinafter more fully appear in the detailed description and the appended claims.

For the purpose of illustrating my invention, I have shown in the accompanying drawings a typical embodiment thereof which is at present preferred by me, since this embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of a variable speed transmission, embodying my invention, with the cover removed.

Figure 2 represents a section on line 2—2 of Figure 1.

Figure 3 represents a section on line 3—3 of Figure 2.

Figure 4 represents a section on line 4—4 of Figure 2.

Figure 5 represents a section on line 5—5 of Figure 2.

Figure 6 represents a section on line 6—6 of Figure 2.

Figure 7 represents, in perspective and in detached position, a driving member employed.

Figure 8 represents, in perspective and in detached position, a plurality of spiral gears and their carrier.

Figures 9 to 14 inclusive represent diagrammatic views, illustrating the different positions which certain of the parts assume during the cycle of the operation.

Similar numerals of reference indicate corresponding parts.

Referring to the drawings:

1 designates a supporting framework in the form of a housing which is preferably made in sections and provided with a removable cover 2, which is secured in position by means of fastening devices 3, whereby upon the removal of the cover the working parts of the transmission are readily accessible for the purpose of inspection or repair. This housing serves as a lubricant container, and is secured in fixed position with respect to its supporting structure in any desired or conventional manner.

4 designates the engine or driving shaft, and 5 designates the driven shaft which latter is operatively connected with the mechanism which is to be driven. The driving shaft 4 is mounted in a bearing 6, which is secured to the housing by means of fastening devices 7. The bearing 6 is provided with the sleeve 8, in which is mounted a bearing bushing 9. In order to effect the proper lubrication of the driving shaft, the bearing sleeve 8 is provided with an oil port 10 which communicates with an oil port 11 in the bearing bushing 9, and, in rear of the sleeve, a lubricant containing chamber 12 is formed from which the lubricant can pass by means of the ports 13 into the lubricant containing chamber of the housing.

The driven shaft 5 is mounted in a manner similar to that in which the driving shaft 4 is mounted, it being best seen from Figure 2 that a bearing 14 is provided which is secured to the housing 1 by means of fastening devices 15. The bearing 14 has a bearing sleeve 16 which carries a bearing bushing 17, similar in construction to that of the bushing 9.

In order to effect the lubrication of the driven shaft 5, the port 18 in the bearing sleeve 16 registers with the port 19 in the bearing member 17, and the sleeve 16 is provided with a port 20 to return the lubricant to the housing chamber. The driving shaft 4 has operatively connected with it a driving member 21, the construction of which will be best understood by reference to Figure 7. The driving member 21 has a fixed center of rotation, and has rectangular openings 22 and 23 cut through it and disposed at an angle to each other, and, as illustrated, these rectangular openings are disposed substantially at right angles to each other.

The driving member 21 is secured to the head 24 of the driving shaft 4 by means of the pins 25, see Figure 2, and by means of screws 26, see Figure 4. The driving member 21, at its opposite end, has connected to it a bearing member 27 by means of pins 28, see Figure 6, and screws 29, see Figure 5. The driven shaft 5 is preferably provided with an enlarged bearing 30, to co-operate with the bearing member 27, see Figure 2.

31 designates a slot which communicates with the opening 22, and, in a similar manner, a slot 32 is provided which communicates with the rectangular opening 23, see more particularly Figure 7.

The openings 22 and 23 in the driving unit 21 form bearing surfaces for the slidable driving gear carriers 33 and 34, respectively, see more particularly Figures 3, 4 and 8. Each driving gear carrier is constructed in a similar manner conforming in contour to its respective opening 22 or 23, in order to be slidable therein, and, as illustrated, the opposite sides are parallel.

The gear carrier 33, as illustrated, is in the form of a rectangularly shaped casing, within which are loosely mounted the spiral gears 35 and 36. The spiral gear 35 is provided at each end with a pinion 37, and the spiral gear 36 is provided at each end with a pinion 38, said pinions being fixed with respect to their respective spiral gears.

As these spiral gears 35 and 36 are loosely mounted in their carrier 33, which latter revolves in unison with the revolution of the driving shaft 4, locking mechanism must be provided for them in order to cause them to drive a spiral pinion 39 which is fixed to the driven shaft 5, see Figure 2.

The locking mechanism for the spiral gears 35 and 36 consists of locking plates 40, to which are connected the pins 41, which are fulcrumed in the aperture 42, see Figure 4. The locking plates 40 are each provided with an upper locking member in the form of a tooth 43 and a lower locking member in the form of a tooth 44, each co-operating with their respective spur gears 37 and 38, respectively.

The plates 40 are connected by the rods 45, and against these rods bear the forward ends of the pins 46, the rear ends of said pins being rounded and contacting with a cam 47, which, as illustrated, is integral with the bearing bushing 9. This cam 47, as indicated in Figure 6, is a special form of cam so that, during one revolution of the driving shaft 4, the teeth 43 will engage the spur gears 37 to lock the spiral gear 35 during a portion of the revolution of the driving shaft 4, and, during another portion of the revolution of the driving shaft 4, the teeth 43 will be held out of engagement with the spur gears 37. In a similar manner, during a portion of the revolution of the driving shaft 4, the teeth 44 will engage the spur gears 38, and during another portion of the revolution of the driving shaft 4 the teeth 44 will be disengaged from the spur gears 38.

The gear carrier 34 is constructed in a similar manner to that of the gear carrier 33, but for the sake of clearness in describing the operation, I have deemed it necessary to describe the detailed construction of the gear carrier 34 and its adjuncts. This gear carrier 34, as illustrated, is in the form of a rectangularly shaped casing having opposite sides parallel. Spiral gears 48 and 49 are loosely mounted at their ends in the gear carrier 34. The spiral gear 48 has fixed with respect to it at each end a spur gear 50, and the spiral gear 49 has fixed with respect to it at each end a spur gear 51.

52 designates locking plates, see Figure 6, which as seen in Figure 3, are carried by the fulcrum pins 53 loosely mounted in the apertures 54 in the gear carrier 34. The locking plates 52 are provided at one end with a locking member in the form of teeth 55 adapted to interlock with the spur gears 50, and, at the opposite end the plates 52 are provided with a locking mechanism in the form of teeth 56 which are adapted to interlock with the spur gears 51. The plates 52 are connected by means of the rods 57, and against these rods bear the actuating pins 58, which are controlled by a cam 59, carried by the bearing 17 and constructed and operating in a similar manner to that of the cam 47. It will thus be understood that during a portion of the revolution of the driving gear carrier 34 the spiral gear 48 is held stationary by the engagement of the teeth 55 with the spur gears 50, and during another portion of the revolution the teeth 55 do not engage with the spur gears 50, and, therefore, the spiral gear 48 is free to revolve. In a similar manner, during a portion of the revolution of the gear carrier 34, the teeth 56 engage with the spur gears 51 to hold the spiral gear 49 stationary, and during another portion of the revolution of the gear carrier 34, the spiral gear 49 is free to revolve.

It will be understood from the foregoing that the casing 21 and the gear carriers 33 and 34 revolve at the same speed as that of the driving shaft 4. These gear carriers 33 and 34, however, have also imparted to them, during their bodily rotation, a reciprocating movement, since they are mounted in a driven member 60, which is in the form of an annulus having the parallel bearing faces 61 and 62 for the gear carrier 33, and the parallel bearing faces 63 and 64 for the gear carrier 34. The faces 61, 62, 63 and 64 are arranged at substantially right angles to each other, in order to conform with the relative disposition of the gear carriers 33 and 34.

The driven member 60 has secured to one end a bearing member 65 by means of fastening devices 66, and, in a similar manner, a bearing member 67 is secured to the driven member 60 by means of fastening devices 68. The bearing members 65 and 67 are provided with the annular bearing portions 69 which are received in the annular bearings 70. These annular bearings 70 are provided with the apertured lugs 71, slidably mounted on the rods 72, which latter pass through the casing 1 and are fixed in position by means of the nuts 73.

The annular bearings 70 and their apertured lugs 71 form a carriage for effecting the adjustment of the driven member 60, and, for this purpose, these bearings 70 are provided with the lugs 74 which are apertured to receive the inner ends of the screws 75 which are fixed to such lugs by means of the pins 76. These screws 75 pass through the pinions 77 and are in threaded engagement therewith, said pinions being provided with the hubs 78 which extend through the housing 1 and are fixed with respect thereto by means of the split rings 79, which engage the grooves 80 in said sleeves.

81 designates covers carried by the housing and forming chambers to receive the screws 75 when they are drawn outwardly. The pinions 77 are in mesh with a gear 82 fixed to a shaft 83, which latter passes through a bearing washer 84 and positioned on the shaft 83 by means of a collar 85, fixed to the shaft 83 by the pin 86.

In order to show a conventional manner of effecting the revolution of the shaft 83 to thereby adjust the carriage, I have shown the shaft 83 as having fixed thereto a hand wheel 87. The extent of movement of the carriage is limited in one direction by the stops 88, and in the opposite direction by means of the stops 89, these stops as illustrated being in the form of sleeves fixed to the upper shafts of the shaft 72.

The spiral gears 48 and 49 are always in mesh with a driven spiral pinion 90 fixed to the driven shaft 5, see Figures 2 and 3. The driven shaft 5 is provided at its inner end with a reduced extension 91, journalled in a bearing 92 carried by the driving shaft 4, and, the driven shaft 5 is also provided with thrust collars 93, see Figures 2 and 6, the bearing 30 also having the function of a thrust collar.

The operation of my novel variable speed transmission will now be readily apparent to those skilled in the art to which this invention appertains and is as follows:

The driving member 21, as before explained, is operatively connected with the driving shaft 4 so that it rotates at all times in unison with it and at the same speed. The driving gear carriers 33 and 34 are movably carried by the driving member 21 and revolve in unison with it and at the same speed. These driving gear carriers 33 and 34, however, have imparted to them during their bodily revolution a reciprocating movement, due to the fact that they are also slidably connected with the driven member 60. The center of rotation of the driving shaft 4 is fixed, but the center of rotation of the driven member 60 is adjustable, so that its center of rotation can be concentric with that of the driving shaft and also of the driven shaft, and it can be adjusted at the will of the operator to a position one side or the other of the center of rotation of the driving shaft 4 in which case its general path is eccentric.

It will be understood that the center of rotation of the driven member can be adjusted relatively to the center of rotation of the driving member to cause the driven shaft to revolve at any desired speed from zero to the maximum speed of the driving member, and from such maximum speed of the driving member above it to any desired degree, depending upon the range of the construction as it is built.

In a similar manner, the center of rotation of the driven member may be adjusted in an opposite direction from the zero point to obtain any desired reverse speed relationship between the driving member and the driven member, so that the driven member may be driven in a reverse direction at any speed between zero and any desired multiple of speed above the maximum speed of the driving shaft, depending upon the range of speed for which the transmission is designed.

Assuming now that the driving shaft 4 and the driving member 21 connected with it are revolving, the position of the driven member is adjusted by actuating the shaft 83 which effects the revolution of the pinions 77 by means of the gear 82, and, as these pinions 77 mesh with the adjusting screws 75, the carriage formed by the bearings 74, which are slidably mounted on the rod 72, will be adjusted to bring its center of rotation at a point which will give the desired speed relationship between the driving and the driven shafts, or the members to which they are connected.

In order to more clearly describe the operation, I have shown the driving and driven members in different positions which they may assume, and, in Figures 9 and 10, they are shown in their position of adjustment when the driving shaft 4 revolves at the same speed as that of the driving shaft 5.

Assuming now that the driving shaft 4 is revolving, and the parts are in the position seen in Figures 9 and 10, the center of rotation of the driving gears and of the driven members 60 is the same as that of the driving shaft. As the shaft 4 revolves, the cam 47 co-operating with its respective pins 46 will cause the teeth 43 to lock with the spur gears 37 and thereby prevent the spiral gear 35 from revolving in its gear carrier 33, so that, as illustrated, during the first quarter of the revolution of the gear carrier 33, the spiral gear 35 is locked with respect to the driven spiral gear 39. The driven shaft 5, therefore, must revolve at the same speed as that of the driving shaft 4. Before this quarter revolution is completed, the cam 59 co-operating with the pin 58 causes the upper teeth 55 to be moved into a position to interlock with the spur gears 50, so that, prior to the release of the teeth 43 with the spur gear 37 and thereby the release of the spiral gear 35, the spiral gear 48 will be locked so that it will not be free to rotate in its carrier 34. During the second quarter of the revolution, as illustrated in Figure 10, the spiral gear 48 causes the driven spiral pinion 90 to revolve at engine speed or the speed of the driving shaft 4. During the third quarter of the revolution, the spiral gear 36 is locked in a similar manner, and during the last quarter of the revolution the spiral gear 49 is locked in a similar manner. The cams 47 and 59 are so arranged that the unlocking action of one spiral gear takes place after the locking action of the next spiral gear. In other words, one has a slight lead over the other, so that at all times there is a driving engagement between the driving and driven shafts.

Referring now to Figures 11 and 12, I have shown the parts in the adjusted positions which they assume at zero or neutral, in which case the driving shaft 4 does not drive the driven shaft 5. In this neutral position shown in Figures 11 and 12, the center of rotation of the driven member 60 is adjusted to such a point that the stroke of the gear carrier 33 in one direction is substantially one-quarter of the pitch circumference of the driven spiral pinions 39 during the quarter revolution during which the spiral gear 35 is locked and this is true of the quarter revolution during which the spiral gear 36 is locked. In a similar manner, the movement in one direction of the gear carrier 34 is substantially one-quarter of the pitch circumference of the driven pinion during the quarter revolution during which the spiral gear 48 is locked, and also during the quarter revolution during which the spiral gear 49 is locked.

It will be understood that during a revolution of the driving member 21 and the gear carriers 33 and 34 that the different spiral gears are locked in position with respect to their carriers during a portion of the bodily revolution of such carriers in a similar manner with that already described with respect to Figures 9 and 10, and a detailed description is therefore believed to be unnecessary.

It will now be apparent, from the operation thus far explained, that if the center of rotation of the driven member 60 is moved to the right of that seen in Figures 11 and 12, the driven shaft 5 will be revolved in a direction reverse to that of the driving shaft 4.

In this case, the movement of a carrier such as 33 or 34 during substantially one-quarter of its bodily revolution is greater than one-quarter of the pitch circumference of the driven spiral pinion 39 or the driven spiral pinion 90, which must necessarily cause the driven shaft to revolve in a reverse direction to that of the driving shaft. It will be apparent that this longitudinal travel of a gear carrier can be such as to give any desired ratio of speed between the driving and driven shafts between zero and the maximum speed of the driving shaft, or from the maximum speed of the driving shaft to any degree above it.

Referring now to the position of the parts seen in Figures 13 and 14, the driven member 60 has had its position adjusted to cause the driven shaft to revolve at a greater speed than that of the driving shaft. In this position the center of rotation of the driven member 60 has been adjusted to the left of that seen in Figures 11 and 12, and also to the left of that seen in Figures 9 and 10.

It will be understood from Figures 11 and 12 that the tendency of a spiral gear revolving during its locked position, see Figures 11 and 12, to rotate the driving pinion, is neutralized or compensated for by the longitudinal travel of its gear carriage, while in Figures 13 and 14, the longitudinal travel of a gear carrier must impart to the driven pinion with which it co-operates an additional portion of a revolution, the amount of which depends upon the amount of longitudinal movement imparted to the gear carriage, or in other words, depends upon the distance between the center of revolution of the driven pinions and that of the driven member 60.

It will thus be apparent that the driven shaft 5 can be driven in either direction at a speed greater than the speed of the driving shaft 4, and that the limit of speed is controlled by the distance between the center of revolution of the driven member 60 and the center of revolution of the driven pinions 39 and 90.

It will be apparent that by varying the contour of the cam surface of the cams 47 and 59, the time at which the spiral gears become locked in their carrier during the bodily rotation of the latter may be varied in accordance with conditions and requirements met with in practice.

In so far as I am aware, I am the first in the art to devise a variable speed transmission wherein by use of the same connecting mechanism between the driving and the driven shafts, I am enabled to vary the speed relationship between said driving and driven shafts in any degree from zero to the maximum speed of the driving shaft or above it to drive the driven shaft in either direction, and I therefore desire my claims to such features to receive the broad and generic interpretation to which a pioneer in the art is entitled.

In my prior application Serial No. 421,808, filed November 5, 1920, I have described and broadly claimed a novel construction of a variable speed transmission wherein a rack and pinion form an operative connection between a driving and a driven member, and an adjustment is provided for the rack to vary the path in which it travels to thereby cause the driven member to have the desired speed relationship with that of the driving member.

I have found, however, in practice that this device is inoperative because there is no rigid driving connection between the driving shaft and its driving member and the annular driven member 60 of my prior application aforesaid. For this reason there is no positive movement of the parts 77 in said application and in operation under load in the drawings of said application the parts 77 move around the driven pinion 76 without causing any positive or sustained rotation of it.

My novel variable speed transmission is also capable of operation if the driven end becomes the driving end. In this case, the gears 39 and 90 become driving members and the gear carriers driven members.

As illustrated, if driven in this manner the range of variable speed would not be as great as if the driving shaft 4 was the driving member.

It will be apparent that I have devised a novel and useful construction of a variable speed transmission which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:—

1. In a variable speed transmission, driving and driven intermeshing gears, said driving gears being rotatable around said driven gears and having also a reciprocatory movement.

2. In a variable speed transmission, driving and driven intermeshing gears, said driving gears being rotatable around said driven gears and having also a reciprocatory movement, and means to cause said driving gears to travel in a path which is concentric or not concentric with that of said driven member.

3. In a variable speed transmission, driving and driven intermeshing gears, said driving gears being loosely mounted and rotatable around said driven gears, and means to cause said driving gears to have a predetermined longitudinal travel during their revolution, the limit of said travel being adjustable at the will of the operator.

4. In a variable speed transmission, driving and driven intermeshing gears, said driving gears being loosely mounted and rotatable around said driven gear, cam actuated means to selectively and progressively lock and unlock each of said driving gears, and means to cause said driving gears to have a predetermined travel during their revolution around said driven gears.

5. In a variable speed transmission, a driving member, gear carriers disposed at an angle to each other and revolved by said driving member, driving gears in said gear carriers, driven gears always in mesh with said driving gears, a driven member cooperating with said gear carriers to cause them to move longitudinally at an angle to each other during their revolution, a carriage in which said driven member is free to rotate, and means to vary the position of said carriage and thereby vary the speed relationship between said driving member and said driven gears.

6. In a variable speed transmission, a driving member, gear carriers revolved thereby, gears in said gear carriers, a driven member revolving at the same speed as said driving member and imparting to said gear carriers a reciprocatory movement during their revolution, driven gears always in mesh with said driving gears, and means to vary the center of rotation of said driven member to vary the speed relationship between said driving member and said driven gears.

7. In a variable speed transmission, a driving member, gear carriers movably mounted therein and disposed at an angle to each other, locking mechanism to progressively and selectively lock said gears with respect to their carriers and including stationary controlling cams, driven gears always in mesh with said driving gears, and means under the control of the operator to cause said gear carriers to have a predetermined length of reciprocatory travel during the revolution of said driving member.

8. In a variable speed transmission, a driving member, gear carriers disposed at an angle to each other and movably carried by said driving member, a driven member having rectangular openings to receive said gear carriers and in which said gear carriers are movable, said gear carriers effecting the revolution of said driven member, driving gears in said gear carriers, driven gears always in mesh with said driving gears, and means to adjust the position of said driven member to vary the speed relationship between said driving members and said driven gears.

9. In a variable speed transmission, driving and driven spiral gears at all times in mesh with each other, means to cause the driving spiral gears to revolve around the driven spiral gears, and means to cause said driving spiral gears to reciprocate during their revolution around said driven spiral gears.

10. In a variable speed transmission, driving and driven spiral gears at all times in mesh with each other, means to bodily revolve said driving gears around said driven gear, and an adjustable constantly rotating member to impart a reciprocatory movement to said driving spiral gears.

11. In a variable speed transmission, a driving shaft, a driven shaft, a driving member carried by the driving shaft and journalled on said driven shaft, gear carriers movably mounted in said driving member and disposed at an angle to each other, driving gears in each gear carrier, driven gears operatively connected with the driven shaft and always in mesh with said driving gear, a controlling member in which said gear carriers are slidable and which controls the length of reciprocatory movement of said gear carriers, a carriage in which said controlling member is rotatably mounted, and means to vary the position of said controlling member.

12. In a variable speed transmission, the combination with a driving and a driven member, of driving gears loosely mounted and bodily rotated by said driving member, driven gears connected with said driven member and intermeshing with said driving gears which latter revolve around the driven gears, means to lock the driving gears during a portion of their bodily revolution and to permit them to revolve during other portions of their bodily revolution, means to cause said driving gears to reciprocate during their bodily revolution, and means to effect the adjustment of the center of rotation of said driving gears to vary the speed relationship between said driving and said driven members.

13. In a variable speed transmission, a driving member having guiding surfaces disposed at an angle to each other, gear carriers movably engaging said surfaces, a rotatable member having guiding surfaces at an angle to each other and with which said gear carriers movably engage, the centers of rotation of said members being relatively adjustable, and a driven member operatively connected with said gear carriers.

14. The construction specified in claim 1 in which the driving parts become the driven parts and the driven parts become the driving parts.

15. The construction specified in claim 2 in which the driving parts become the driven parts and the driven parts become the driving parts.

WALTER B. JACKSON.